US012102587B2

(12) United States Patent
Battuello et al.

(10) Patent No.: US 12,102,587 B2
(45) Date of Patent: Oct. 1, 2024

(54) CRUTCH

(71) Applicants: Craig Battuello, Saint Helena, CA (US); Alexander Mitchell, Saint Helena, CA (US)

(72) Inventors: Craig Battuello, Saint Helena, CA (US); Alexander Mitchell, Saint Helena, CA (US)

(*) Notice: Subject to any disclaimer, the term of this patent is extended or adjusted under 35 U.S.C. 154(b) by 141 days.

(21) Appl. No.: 17/871,898

(22) Filed: Jul. 23, 2022

(65) Prior Publication Data

US 2023/0037067 A1 Feb. 2, 2023

Related U.S. Application Data

(60) Provisional application No. 63/225,981, filed on Jul. 27, 2021.

(51) Int. Cl.
*A61H 3/02* (2006.01)

(52) U.S. Cl.
CPC ......... *A61H 3/0277* (2013.01); *A61H 3/0288* (2013.01); *A61H 2003/0216* (2013.01); *A61H 2003/0283* (2013.01); *A61H 2201/0188* (2013.01); *A61H 2201/0192* (2013.01)

(58) Field of Classification Search
CPC .......... A61H 3/0277; A61H 2003/0283; A61H 3/0288; A61H 2003/0205; A61H 2003/0216
See application file for complete search history.

(56) References Cited

U.S. PATENT DOCUMENTS

| | | | | | |
|---|---|---|---|---|---|
| 1,334,208 | A * | 3/1920 | Ames | A61H 3/0277 | 135/82 |
| 1,635,914 | A * | 7/1927 | Weis | A61H 3/02 | 135/68 |
| 2,398,247 | A * | 4/1946 | Redcliffe | A61H 3/02 | 135/69 |
| 2,442,896 | A * | 6/1948 | Selig | A61H 3/02 | 135/73 |
| 2,642,074 | A * | 6/1953 | Pedley | A61H 3/02 | 135/65 |
| 2,690,188 | A * | 9/1954 | Goddard | A61H 3/02 | 135/72 |

(Continued)

FOREIGN PATENT DOCUMENTS

| | | | | |
|---|---|---|---|---|
| CN | 109966119 A * | 7/2019 | | A61H 3/02 |
| CN | 111214366 A * | 6/2020 | | |

(Continued)

*Primary Examiner* — David R Dunn
*Assistant Examiner* — Danielle Jackson
(74) *Attorney, Agent, or Firm* — AKC PATENTS, LLC; Aliki K. Collins

(57) ABSTRACT

An improved crutch includes an improved shock absorbing mechanism, lighting components, and an improved tip component. The improved shock absorber mechanism utilizes compressible spheres that are compressed when a person supports all or partial of their body weight onto the crutch and are uncompressed when the weigh is removed. This compression of the spheres absorbs any impact from the walking surface to the person's body. The elasticity of the compressible spheres is adjusted by forming a central through-opening through the sphere, varying the number of the sphere, their diameter and material.

19 Claims, 17 Drawing Sheets

(56) References Cited

U.S. PATENT DOCUMENTS

| | | | | | |
|---|---|---|---|---|---|
| 2,888,022 | A * | 5/1959 | Fanning | A61H 3/0277 135/82 |
| 3,923,292 | A * | 12/1975 | Madden, Jr. | B60R 19/20 188/377 |
| 4,010,940 | A * | 3/1977 | Freyler | F16F 13/002 188/129 |
| 5,103,850 | A * | 4/1992 | Davis | A61H 3/0288 135/84 |
| 5,353,825 | A * | 10/1994 | Davis | A45B 9/04 135/84 |
| 5,417,234 | A * | 5/1995 | Davis | A61H 3/0288 135/73 |
| 5,720,474 | A | 2/1998 | Sugiyama | |
| 6,186,487 | B1 | 2/2001 | Kesinger | |
| 7,025,072 | B2 * | 4/2006 | McGrath | A45B 9/00 135/82 |
| 11,173,094 | B1 * | 11/2021 | McGarvey | A61H 3/0277 |
| 2005/0129456 | A1 * | 6/2005 | Van Der Sluis | A61H 3/0277 403/109.1 |
| 2008/0053503 | A1 * | 3/2008 | Larson | A61H 3/0277 135/71 |

FOREIGN PATENT DOCUMENTS

| | | | | |
|---|---|---|---|---|
| EP | 1707175 | A1 * | 10/2006 | A61H 3/02 |
| FR | 625044 | A * | 8/1927 | |
| GB | 191200424 | A * | 4/1912 | |
| GB | 196117 | A * | 4/1923 | |
| GB | 320562 | A * | 10/1929 | |
| KR | 910005938 | Y1 * | 8/1991 | |
| KR | 100702936 | B1 * | 4/2007 | |
| KR | 20120032637 | A * | 4/2012 | |
| KR | 20140018721 | A * | 2/2014 | |
| SU | 721097 | A1 * | 3/1980 | |
| WO | WO-9842292 | A1 * | 10/1998 | A61H 3/0277 |

* cited by examiner

CRUTCH

CROSS REFERENCE TO RELATED CO-PENDING APPLICATIONS

This application claims the benefit of US provisional application Ser. No. 63/225,981 filed on Jul. 27, 2021 and entitled IMPROVED CRUTCH, the contents of which are expressly incorporated herein by reference.

FIELD OF THE INVENTION

The present invention relates to an improved crutch and more particularly, to a crutch with an improved and adjustable shock absorbing mechanism.

BACKGROUND OF THE INVENTION

Referring to FIG. 1, a prior art crutch 50 includes two longitudinally extending legs 51*a*, 51*b* that converge into a single post 57. An arm support pad 52 sits onto and joins the top ends of legs 51*a*, 51*b* and a handle 54 extends horizontally midway between the two legs 51*a*, 51*b*. Post 57 includes a tip component (boot)58 at its distal end. The distal ends of legs 51*a*, 51*b* and the top end of post 57 are attached to a support component 56. In some cases, support component 56 provides a crutch length adjustment mechanism. A patient places their arm over the arm support pad 52 and holds the handle 54 with their hand in order to support all or partial of their body weight onto the crutch.

Several shock absorbing mechanisms have been suggested for the crutch post 57 in order to reduce the impact of the walking surface to the patient's body as the patient moves with the help of the crutch. Some of these shock absorption mechanisms include springs or pneumatic absorbers, among others. While various configurations have been proposed, there is still a need for an adjustable shock absorbing mechanism that can be used for patients of different heights and weights and for walking on surfaces with different hardness.

SUMMARY OF THE INVENTION

The invention provides an improved crutch that includes an improved and adjustable shock absorbing mechanism, lighting components and an improved tip component.

In general, in one aspect, the invention features an improved crutch including a first shock absorbing post comprising a first elongated tube, a second elongated tube and an intermediary tubular component positioned between the first elongated tube and the second elongated tube. The intermediary tubular component includes a central opening extending between a first end and a second end and is sized and shaped to slidably receive a first end of the first elongated tube into the first end of the central opening and a first end of the second elongated tube into the second end of the central opening. The first elongated tube comprises an opening and the intermediary tubular component comprises an elongated slot and the first elongated tube is configured to be secured to the intermediary tubular component via a removable pin that is inserted into the elongated slot of the intermediary tubular component and the opening of the first elongated tube. The intermediary tubular component further comprises one or more shock absorbing components that are positioned within the central opening. Sliding of the first elongated tube into or out of the central opening of the intermediary tubular component compresses or decompresses the shock absorbing components, respectively.

Implementations of this aspect of the invention may include one or more of the following features. The shock absorbing components comprise compressible spheres. The compressible spheres are solid and comprise a center through-opening. The compressible spheres are hollow. The compressible spheres are glued together. The compressible spheres comprise one of silicone, natural rubber, neoprene rubber, Viton® fluoroelastomer or polyurethane and have a hardness in the range of 35A to 70A (Shore Durometer). The first elongated tube, the second elongated tube and the intermediary tubular component comprise one of aluminum, carbon fiber material, metals, alloys or composite materials. The intermediary tubular component further comprises a non-metallic inner lining tube or coating. The sliding of the first elongated tube into or out of the central opening of the intermediary tubular component has a range determined by the length of the elongated slot of the intermediary tubular component. The improved crutch further includes a second shock absorbing post comprising a first elongated tube, a second elongated tube and an intermediary tubular component positioned between the first elongated tube and the second elongated tube. The intermediary tubular component comprises a central opening extending between a first end and a second end and is sized and shaped to slidably receive a first end of the first elongated tube into the first end of the central opening and a first end of the second elongated tube into the second end of the central opening. The first elongated tube comprises an opening and the intermediary tubular component comprises an elongated slot and the first elongated tube is configured to be secured to the intermediary tubular component via a pin that is inserted into the elongated slot of the intermediary tubular component and the opening of the first elongated tube. The intermediary tubular component further comprises one or more shock absorbing components that are positioned within the central opening. Sliding of the first elongated tube into or out of the central opening of the intermediary tubular component compresses or decompresses the shock absorbing components, respectively. The improved crutch further includes a first connecting component extending between and connecting a second end of the first elongated tube of the first shock absorbing post and a second end of the first elongated tube of the second shock absorbing post. The improved crutch further includes a second connecting component extending between and connecting midway points of the first elongated tube of the first shock absorbing post and the first elongated tube of the second shock absorbing post. The improved crutch further includes a support component extending between and connecting the second elongated tube of the first shock absorbing post and the second elongated tube of the second shock absorbing post. The improved crutch further includes a post extending from a distal end of the support component and terminating to at a tip component. The tip component comprises a bottom surface having ridges and or indentations. The tip component comprises a triangular side extension used to stabilize the crutch in an upright position. The tip component comprises a bottom surface that is tapered from an outside edge to an inside edge of the bottom surface. The improved crutch further includes a first post extending from a distal end of the second elongated tube of the first shock absorbing post and terminating at a first tip component. The improved crutch further includes a second post extending from a distal end of the second elongated tube of the second shock absorbing post and terminating at a second tip component. The improved crutch further includes a first lighting component attached to the first shock absorbing post.

In general, in another aspect, the invention features a shock absorbing post including a first elongated tube, a second elongated tube and an intermediary tubular component positioned between the first elongated tube and the second elongated tube. The intermediary tubular component comprises a central opening extending between a first end and a second end and is sized and shaped to slidably receive a first end of the first elongated tube into the first end of the central opening and a first end of the second elongated tube into the second end of the central opening. The first elongated tube comprises an opening and the intermediary tubular component comprises an elongated slot and the first elongated tube is configured to be secured to the intermediary tubular component via a removable pin that is inserted into the elongated slot of the intermediary tubular component and the opening of the first elongated tube. The intermediary tubular component further includes one or more shock absorbing components that are positioned within the central opening. Sliding of the first elongated tube into or out of the central opening of the intermediary tubular component compresses or decompresses the shock absorbing components, respectively.

The details of one or more embodiments of the invention are set forth in the accompanying drawings and description below. Other features, objects, and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

The invention provides an improved crutch including an improved shock absorbing mechanism, lighting components, and improved tip components.

Figure 1:
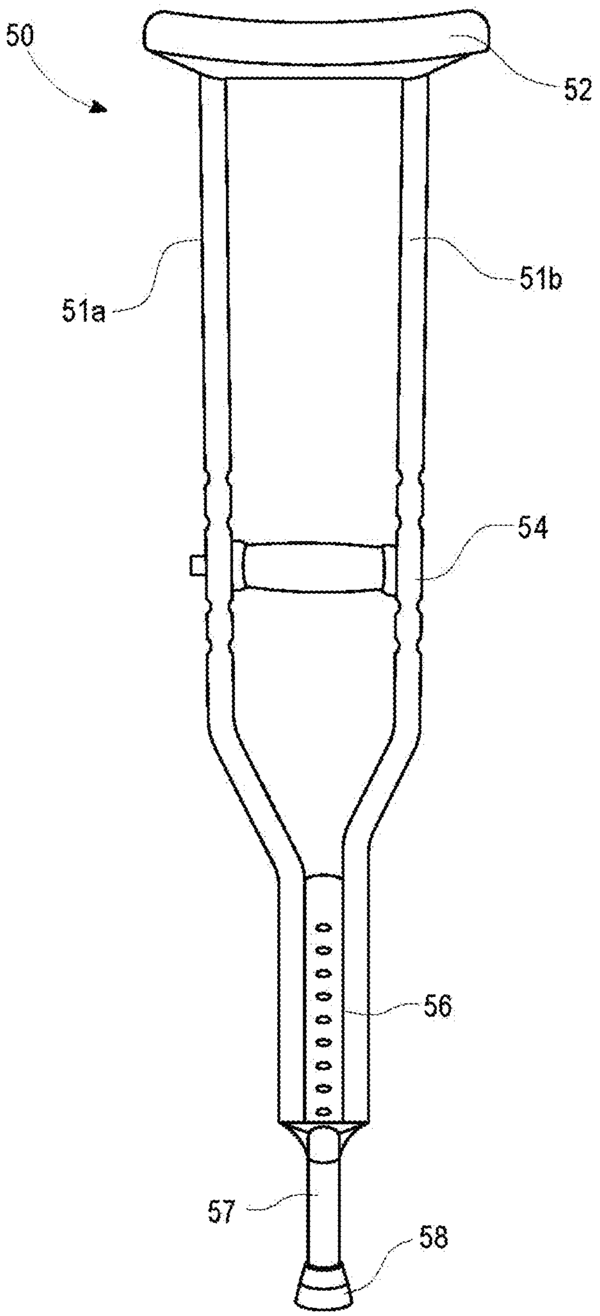
FIG. 1 (Prior Art)
FIG. 1 is a side view of a prior art crutch.
Figure 2A:
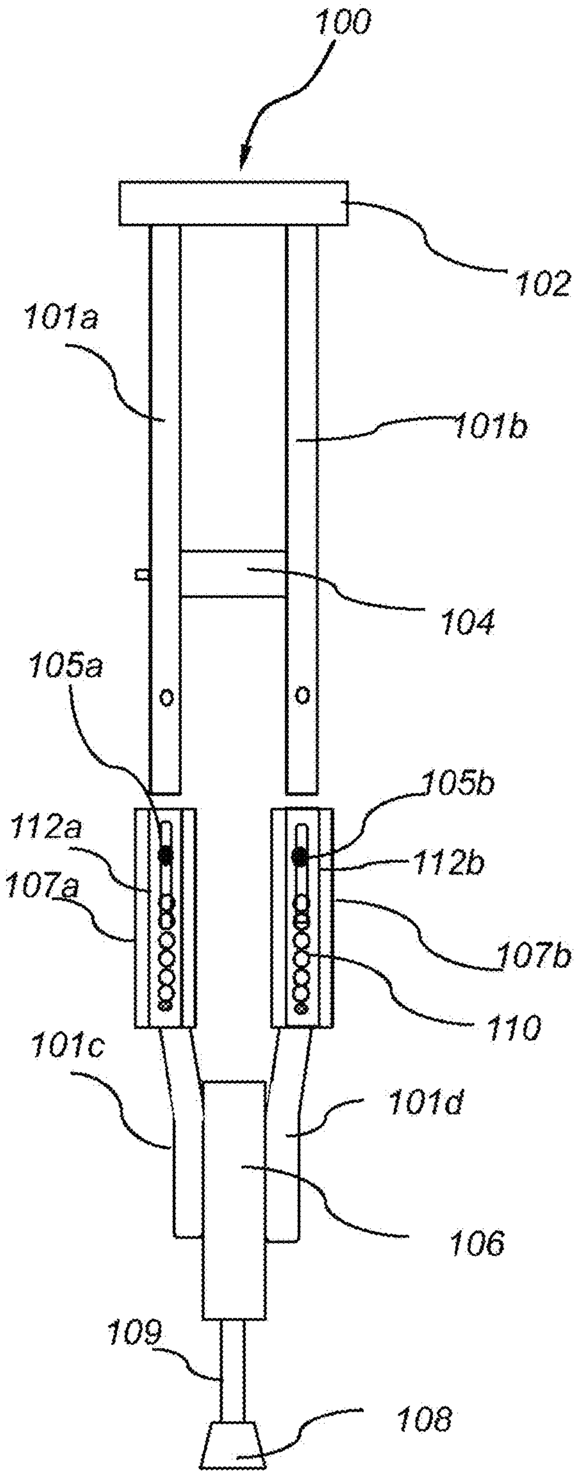
FIG. 2A is a partially exploded side view of an improved crutch in an uncompressed state, according to this invention.
Figure 2B:
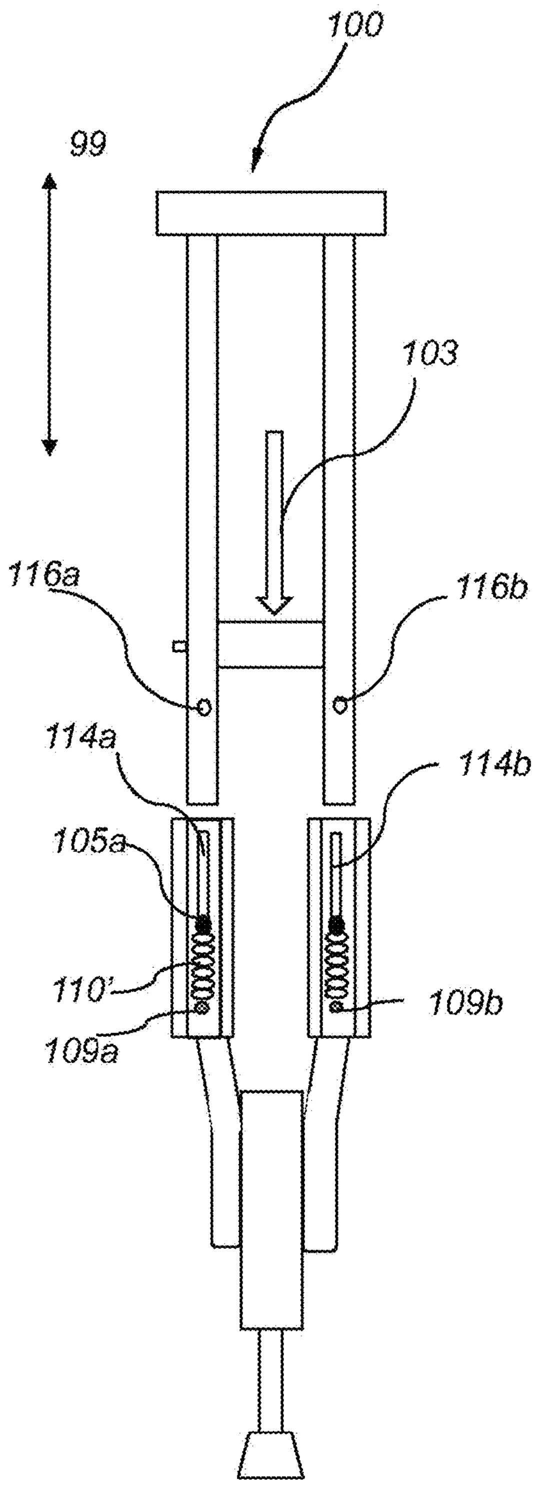
FIG. 2B is a partially exploded side view of an improved crutch in a compressed state, according to this invention.
Figure 3:
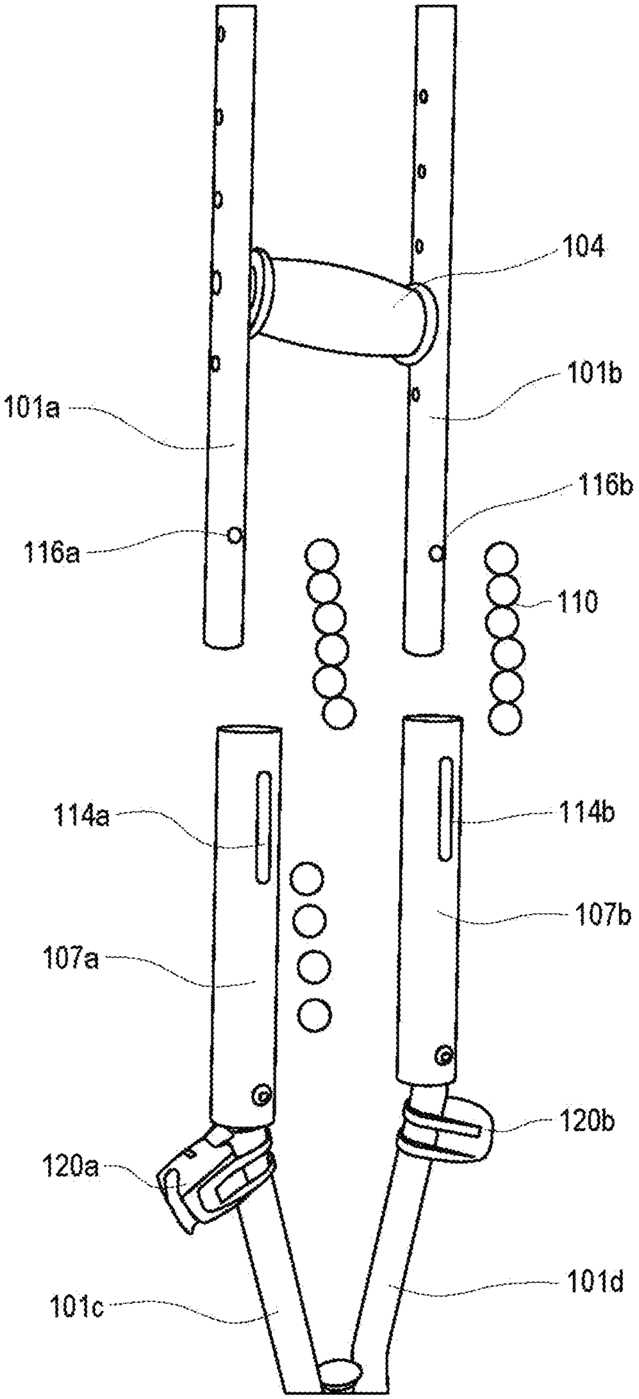
FIG. 3 is a partially exploded perspective view of an improved crutch, according to this invention.

Referring to FIG. 2, FIG. 2B, FIG. 3, an improved crutch 100 includes two longitudinally extending upper legs 101*a*, 101*b*, two intermediary components 107*a*, 107*b*, two lower legs 101*c*, 101*d*, support component 106, post 109, tip component 108, arm support pad 102 and handle 104. Arm support pad 102 extends horizontally and connects the top ends of the upper legs 101*a*, 101*b*. Handle 104 extends horizontally midway between the two upper legs and connects them. A patient places their arm over the arm support pad 102 and holds the handle 104 with their hand in order to support all or partial of their body weight onto the crutch. Intermediary components 107*a*, 107*b* connect the upper legs 101*a*, 101*b* to the lower legs 101*c*, 101*d*, respectively. Lower legs 101*c*, 101*d* connect to the support component 106 and post 109 extends from the distal end of the support component 106 and terminates to the tip component 108. Upper legs 101*a*, 101*b*, intermediary components 107*a*, 107*b*, lower legs 101*c*, 101*d*, support component 106, and post 109 are usually made of aluminum, carbon fiber material, or other metals and composites.

Figure 4:
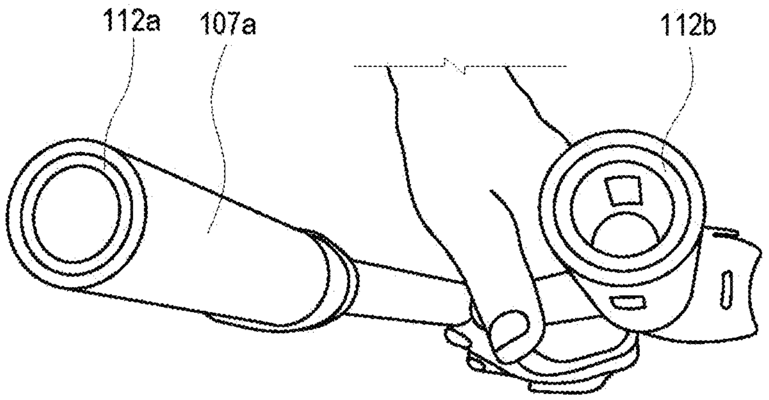
FIG. 4 is a top view of the intermediary components of the improved crutch of FIG. 3.
Figure 5:
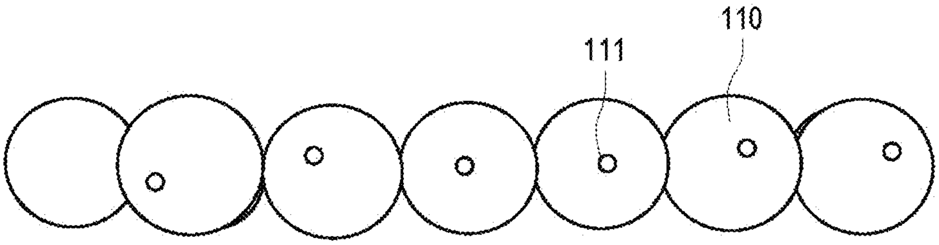
FIG. 5 is a top view of the compression spheres of FIG. 3.
Figure 6A:
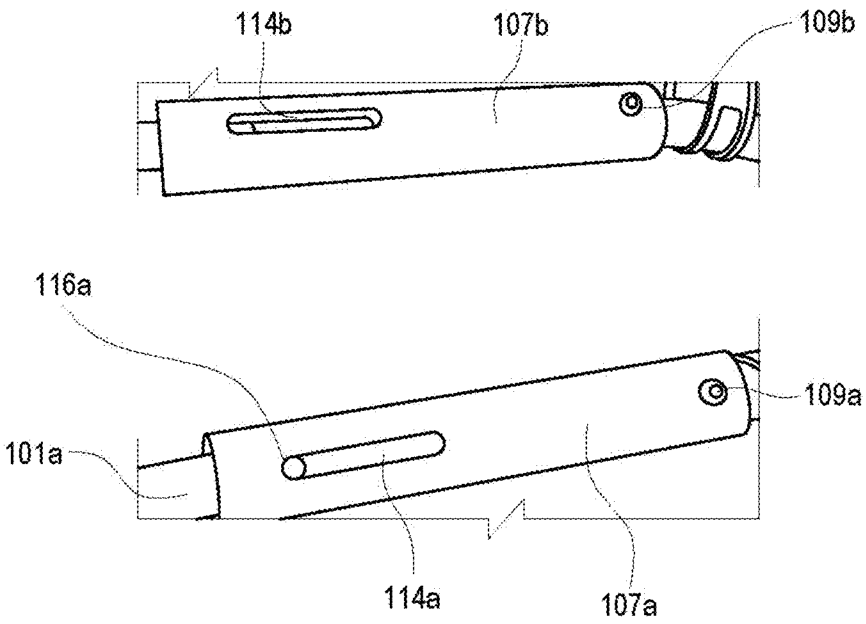
FIG. 6A is a side view of the intermediary components of the improved crutch of FIG. 3.
Figure 6B:
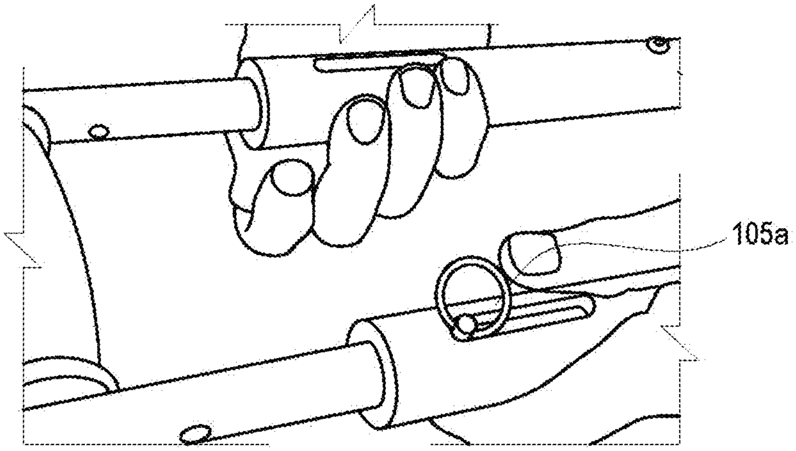
FIG. 6B is a side view of the partially assembled intermediary components of the improved crutch of FIG. 3.
Figure 7A:
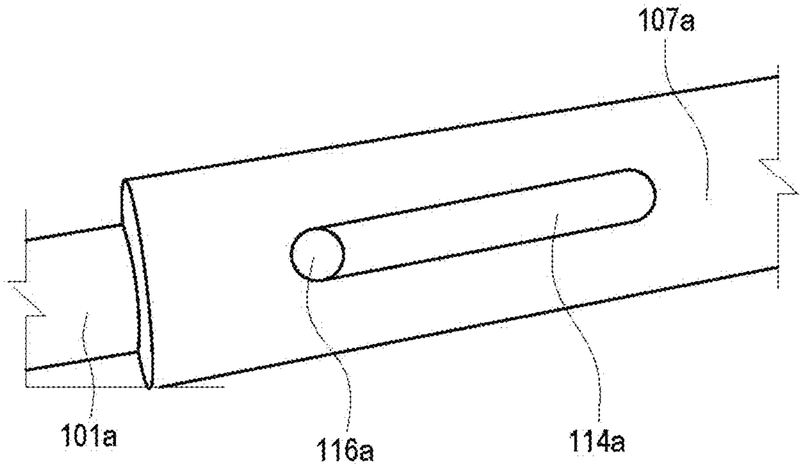
FIG. 7A is an enlarged side view of a portion of the intermediary component of the improved crutch of FIG. 3.
Figure 7B:
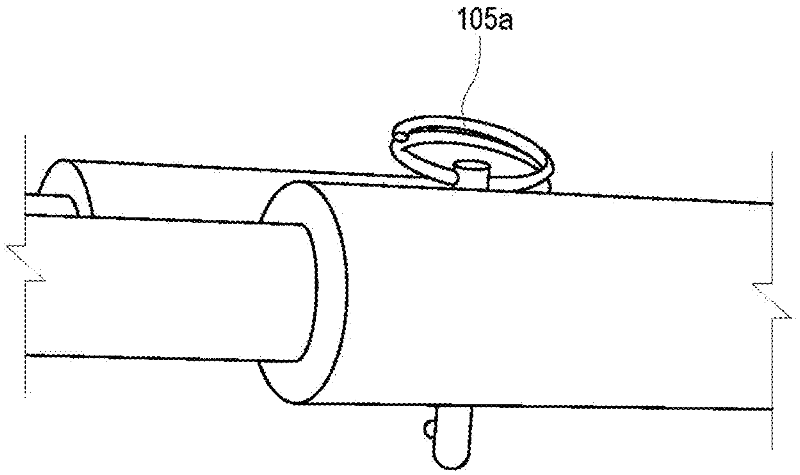
FIG. 7B is an enlarged side view of the assembled portion of the intermediary component of FIG. 7A.
Figure 8A:
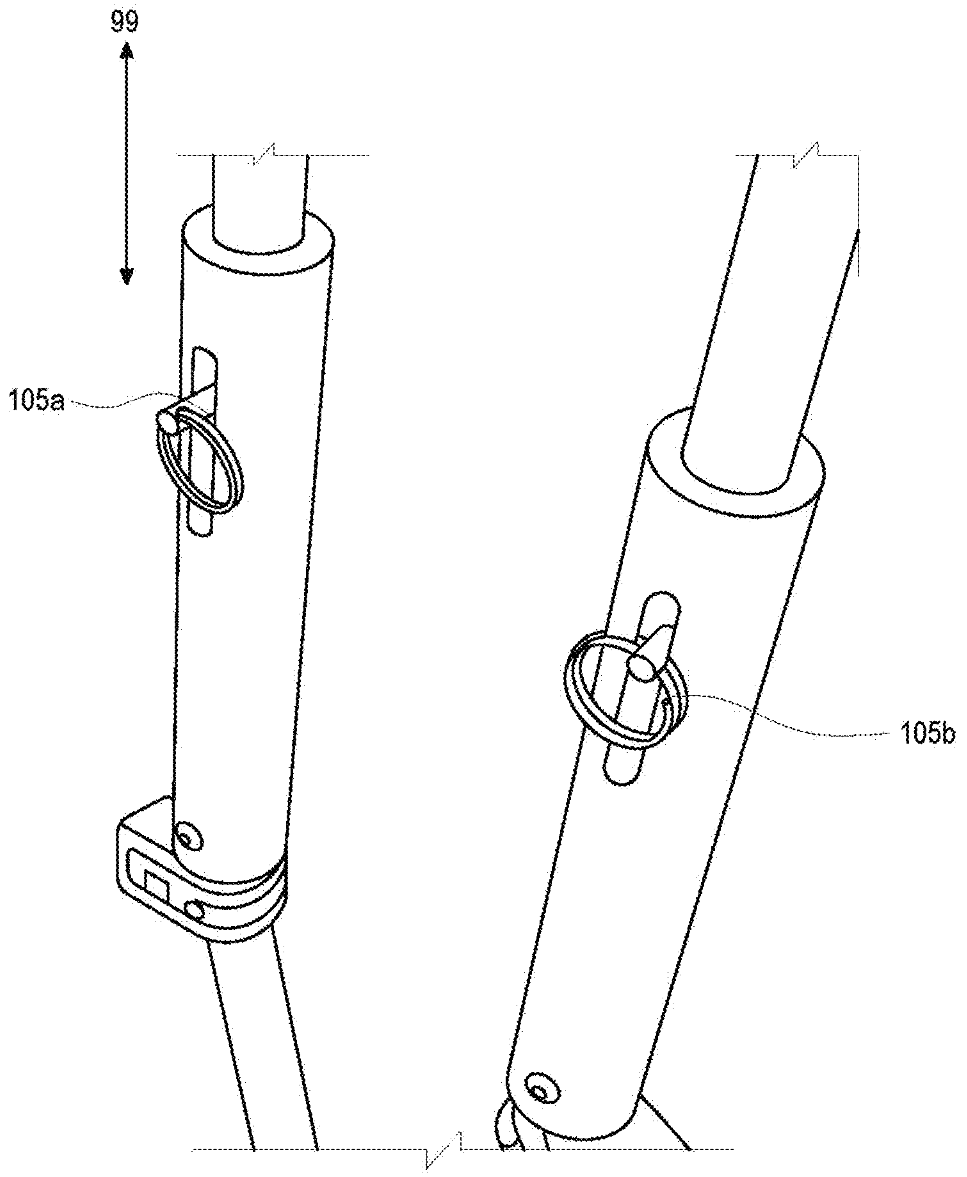
FIG. 8A is a perspective view of the intermediary components of the improved crutch of FIG. 3.
Figure 8B:
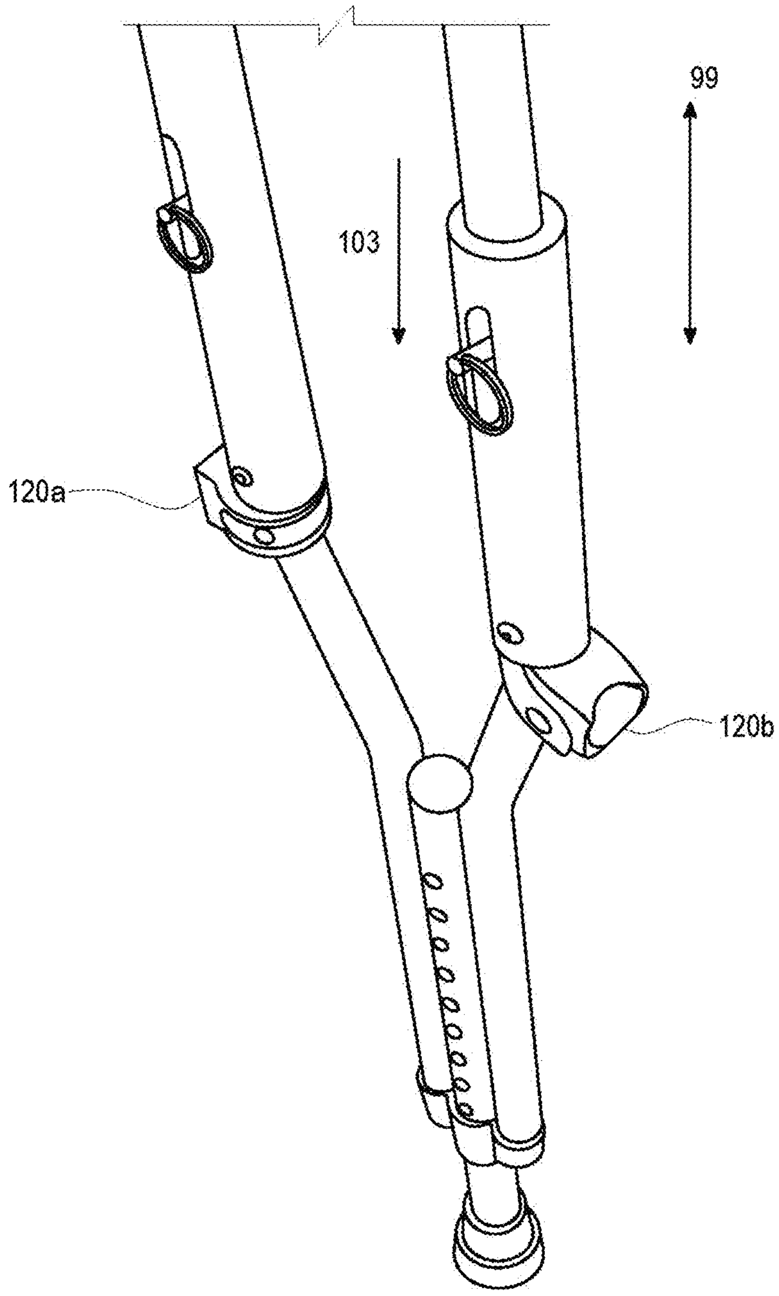
FIG. 8B is a perspective view of the intermediary components of the improved crutch of FIG. 3 in a compressed state.

Referring to FIG. 3 and FIG. 4, intermediary components 107*a*, 107*b* are cylindrical tubes that are configured to slidably receive the upper legs 101*a*, 101*b*, into their top portions and the lower legs 101*c*, 101*d* into their lower portions, respectively. Each intermediary component 107*a*, 107*b* includes a non-metallic inner lining tube 112*a*, 112*b*, respectively, that facilitates the sliding motion of the upper legs 101*a*, 101*b* within the tube. In one example, the intermediary components 107*a*, 107*b* are made of aluminum and the inner tube 112 is made of a plastic material. The inner diameter of the intermediary components is larger than the outer diameter of the upper legs 101*a*, 101*b* and the outer diameter of the lower legs 101*c*, 101*d*. In one example, intermediary components 107*a*, 107*b* have an inner diameter of ¾ inch, an outer diameter of 1 and ¼ inch and a length of about 7 and ⅝ inches. In some embodiments, the tops of the intermediary components 107*a*, 107*b* extend by another 2 inches. Upper legs 101*a*, 101*b* and lower legs 101*c*, 101*d* are about 31 inches long and have an outer diameter of about 0.7 inch. Each intermediary component 107*a*, 107*b* also includes a slot opening 114*a*, 114*b*, that is dimensioned to receive a pin 105*a*, 105*b*, respectively, as shown in FIG. 6A and FIG. 6B. Each upper leg 101*a*, 101*b* includes an opening 116*a*, 116*b*, that is dimensioned to also receive the pin 105*a*, 105*b*, respectively. Upper leg 101*a*, is inserted into the upper portion of the intermediary component 107*a* and opening 116*a* of the upper leg is aligned with the slot opening 114*a* of the intermediary component and pin 105*a* is inserted into the aligned openings 114*a*, 116*a*. Similarly, upper leg 101*b*, is inserted into the upper portion of the intermediary component 107*b* and opening 116*b* of the upper leg is aligned with the slot opening 114*b* of the intermediary component and pin 105*b* is inserted into the aligned openings 114*b*, 116*b*, as shown in FIG. 6A, FIG. 6B, FIG. 7A, FIG. 7B. Pins 105*a*, 105*b*, secure the upper legs 101*a*, 101*b* to the intermediary components 107*a*, 107*b*, while allowing them to slide down and up along the direction of arrow 99 when a force 103 is applied or removed, as shown in FIG. 8A and FIG. 8B. The range of the up and down sliding motion is determined by the length of the slot openings 114*a*, 114*b*. In one example, slot openings 114*a*, 114*b* are ¼ inch wide and about 2 inches long and pins 105*a*, 105*b* travel up and down about ½ inch for a person that has a weight of about 210 pounds. Each intermediary component 107*a*, 107*b* also includes compressible spheres 110. In one example, seven compressible spheres 110 are inserted into each of the intermediary components 107*a*, 107*b* and function as shock absorbers for the up and down sliding motion of the upper legs 101*a*, 101*b* within the intermediary tubular components 107*a*, 107*b*, respectively. In one example, spheres 110 have a diameter of ⅝ inch, are made of silicone material and have a hardness of 35A (Shore Durometer). In other examples, spheres 110 have a diameter of 740 thousandths of an inch. In each sphere 110, a center through-opening 111 is drilled having a diameter of 3/16 inch, as shown in FIG. 5. Spheres 110 are glued together with craft glue. In other examples, spheres 110 are hollow or made of other materials such as natural rubber, neoprene rubber, Viton® fluoroelastomer or polyurethane and have different hardness in the range of 35A to 70A (Shore Durometer). The diameter of the center through-opening may vary in the range of 0.15 to 0.2 inch. The shock absorption capability of the crutch 100 is adjusted by varying the elasticity of the compressible spheres 110, or by varying the number of the spheres, or their diameter. The elasticity of the compression spheres 110 is varied either by the type of the sphere material or by varying the diameter of the central through-opening 111.

Figure 9A:
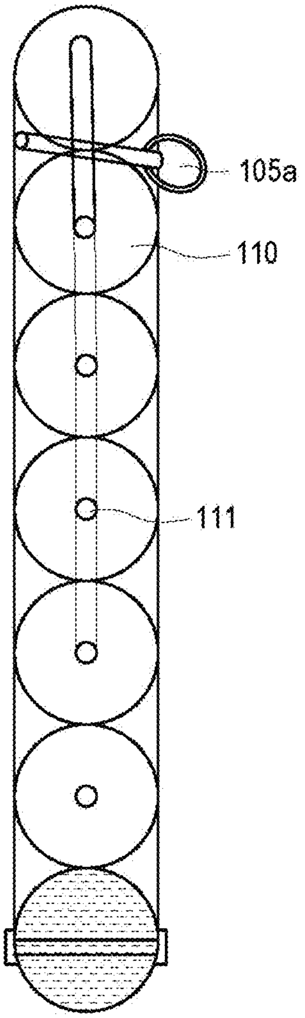
FIG. 9A is a side view of the compression spheres of FIG. 3 in the uncompressed state.
Figure 9B:
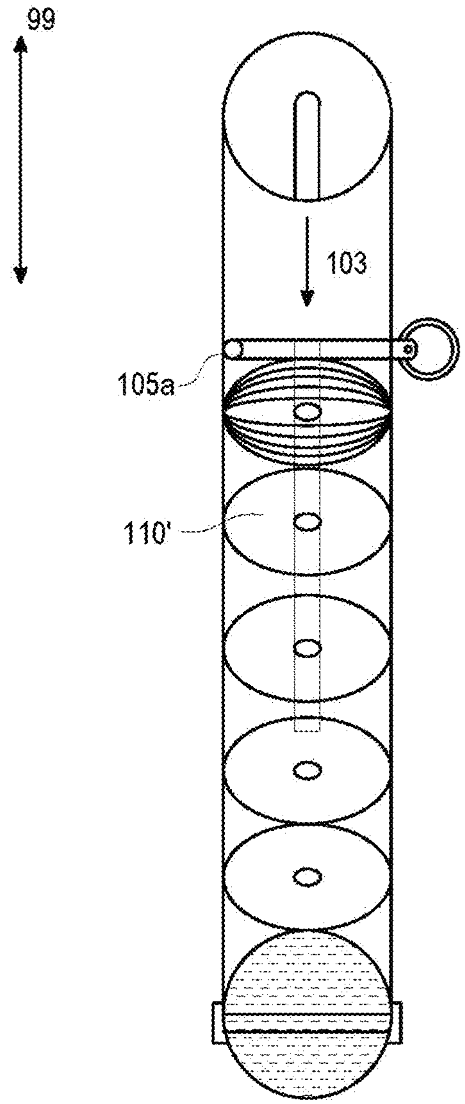
FIG. 9B is a side view of the compression spheres of FIG. 3 in the compressed state.

In operation, a person places their arm onto the arm pad 102 and supports their weight onto handle 104. The person's weight applies a downward force 103 that causes the upper legs 101*a*, 101*b* to slide down within the intermediary components 107*a*, 107*b*. As the upper legs 101*a*, 101*b*, slide down within the intermediary components 107*a*, 107*b*, they compress the spheres 110 into a compressed state, as shown in FIG. 9B. When force 103 is removed spheres 110 become uncompressed, as shown in FIG. 9A and the upper legs 101*a*, 101*b* slide up within the intermediary components 107*a*, 107*b*. In this way, spheres 110 absorb any shock applied by the solid walking surface during walking with the assistance of the crutch 100.

Figure 10:
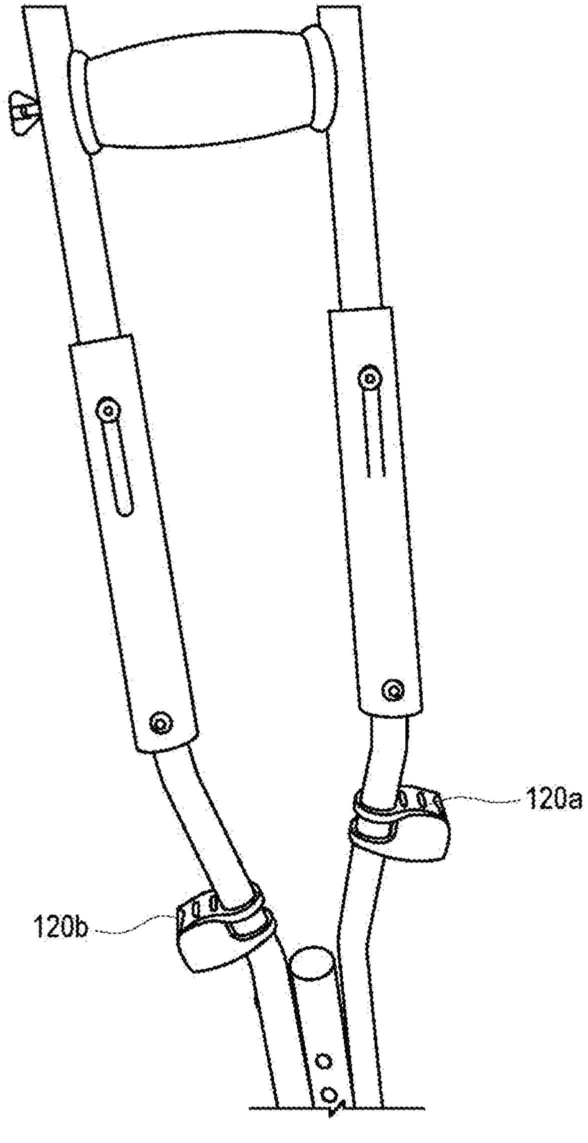
FIG. 10 is a perspective view of the intermediary components of the improved crutch of this invention including lighting components.

As shown in FIG. 3, FIG. 8B, and FIG. 10, crutch 100 also includes lighting components 120*a* and 120*b* that have a clear light pointing forward (120*b*) and a red light pointing backward (120*a*). Lighting components 120*a*, 120*b*, are used when walking with the help of the crutch 100 in dark areas and during the night. Lighting components 120*a*, 120*b* may be solid or blinking, are visible from a distance of about 500 feet and can be moved up and down depending upon the desired lighting path length.

Figure 11:
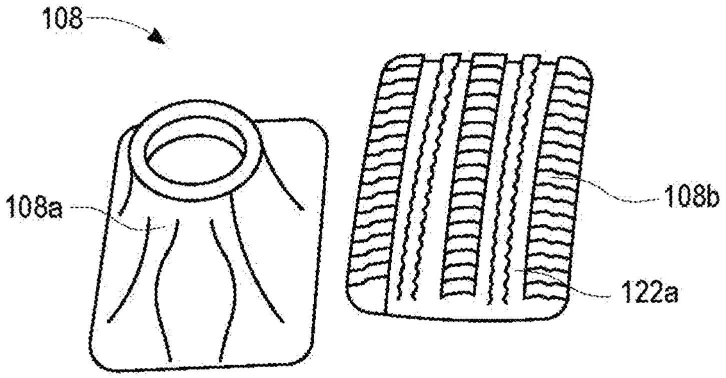
FIG. 11 depicts top and bottom views of the tip components of the improved crutch, according to this invention.
Figure 12A:
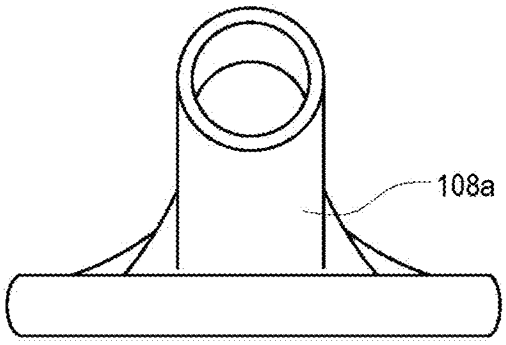
FIG. 12A depicts a side view of another embodiment of the tip component of the improved crutch, according to this invention.
Figure 12B:
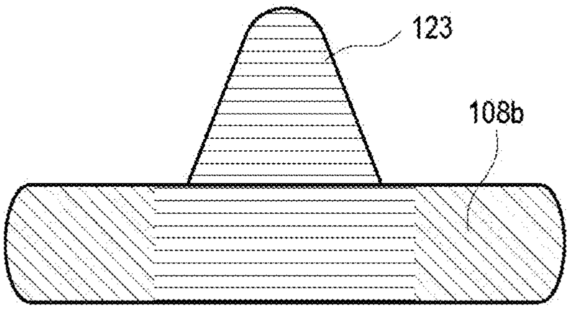
FIG. 12B depicts a bottom view of the tip component of FIG. 12A, according to this invention.
Figure 12C:
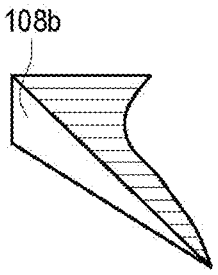
FIG. 12C depicts an enlarged view of the tapered edge of the tip component of FIG. 12A.

Referring to FIG. 11, tip component 108 includes a top surface 108*a* and a bottom surface 108*b*. Top surface 108*a* has an opening configured to receive post 109 and bottom surface 108*b* has ridges 122*a* designed to prevent sliding of the tip on the walking surface. In other embodiments, tip component 108 includes a triangular side extension 123 that is used to stabilize the crutch in an upright position when not in use, as shown in FIG. 12B. The bottom surface 108 of the tip component may be tapered by 10-15 degrees from the outside edge to the inside edge, as shown in FIG. 12C. The tapering of the bottom surface 108*b* of the tip component 108 and ridges 122*a* prevent the crutches from sliding outward to the sides when they are positioned behind the legs of the user and are used for leaning back while resting.

Figure 13:
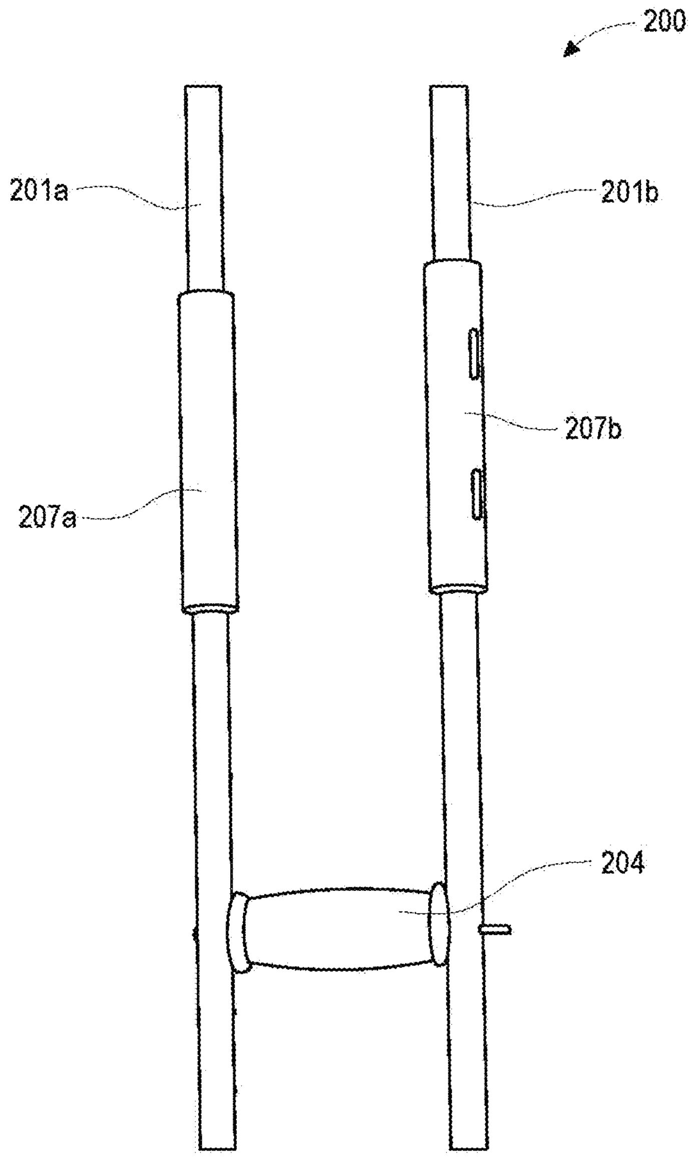
FIG. 13 is a perspective side view of the intermediary components of another embodiment of an improved crutch according to this invention.

Crutch 100 is adjustable in height for persons of height in the range of 5 feet and 10 inches to 6 feet and 6 inches. In another embodiment, crutch 200 is adjustable in height for persons of height in the range of 4 feet to 5 feet and 10 inches. In this embodiment, the intermediary components 207*a*, 207*b* are located above the handle 204, as shown in FIG. 13.

Figure 14:
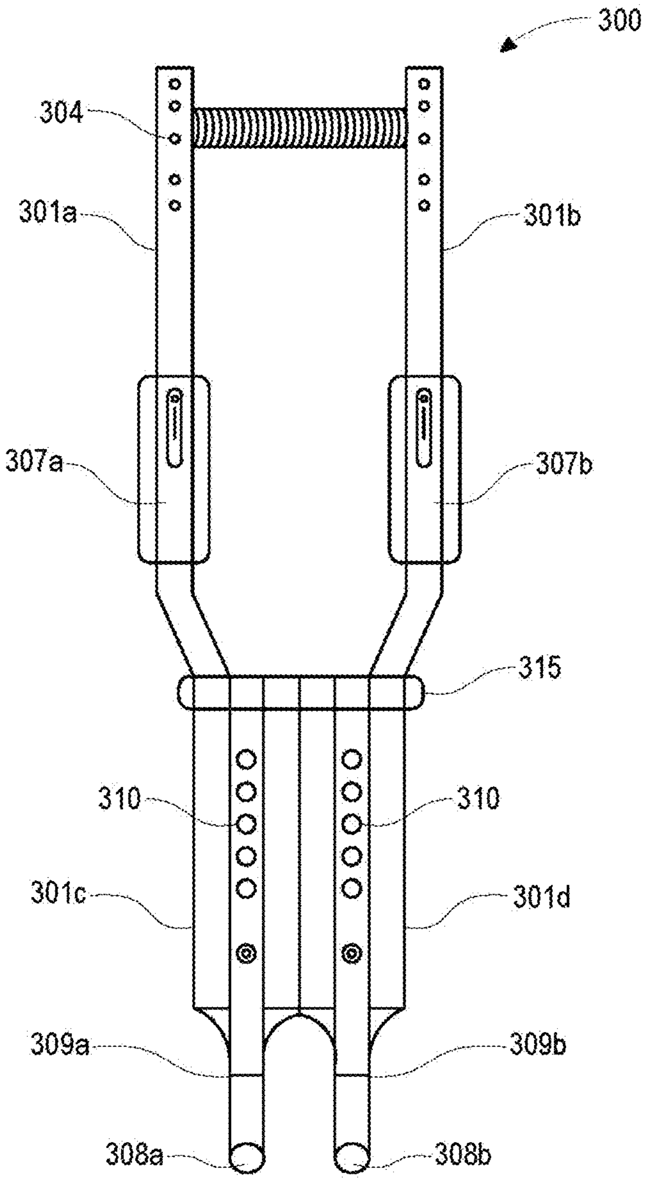
FIG. 14 is a side view of yet another embodiment of an improved crutch according to this invention.
Figure 15:
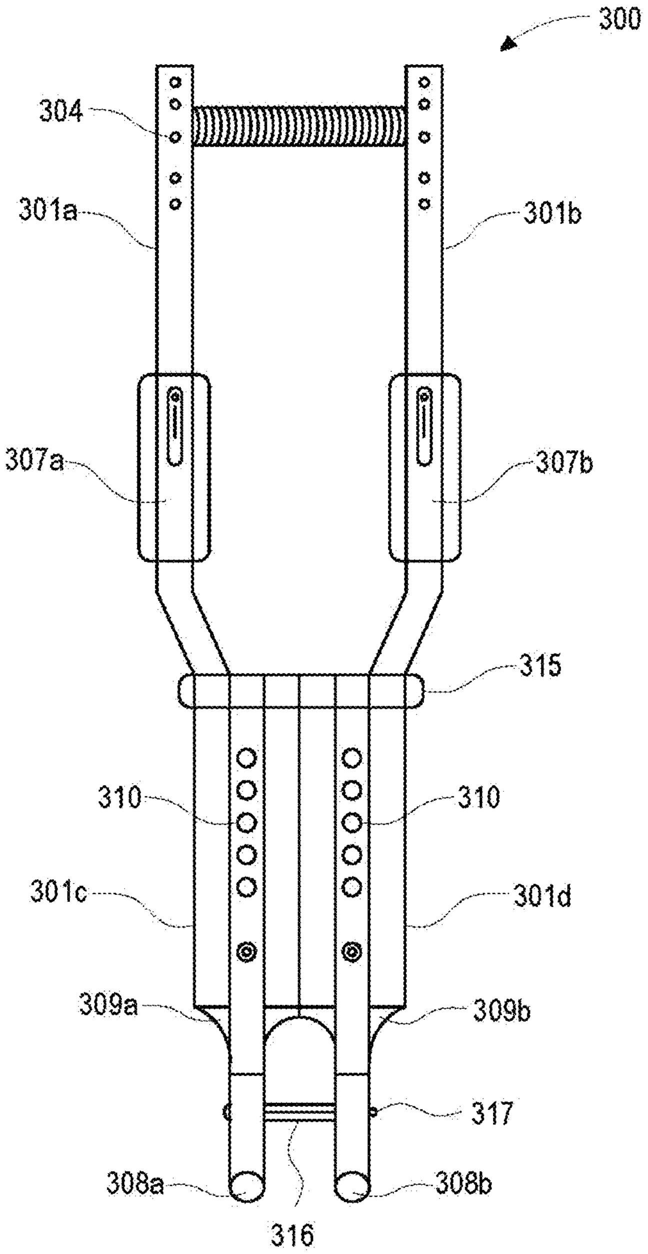
FIG. 15 is a side view of yet another embodiment of an improved crutch according to this invention.
Figure 16:
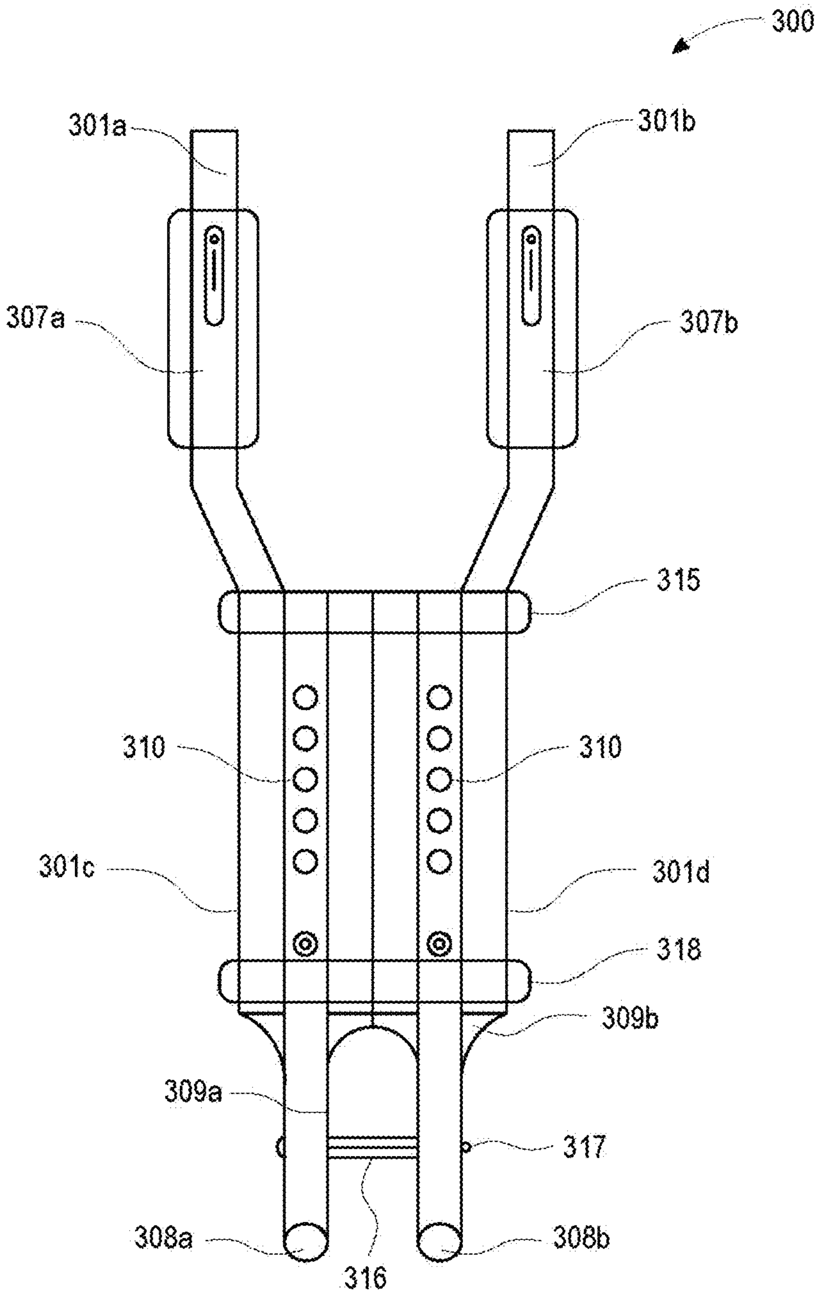
FIG. 16 is a side view of yet another embodiment of an improved crutch according to this invention.
Figure 17A:
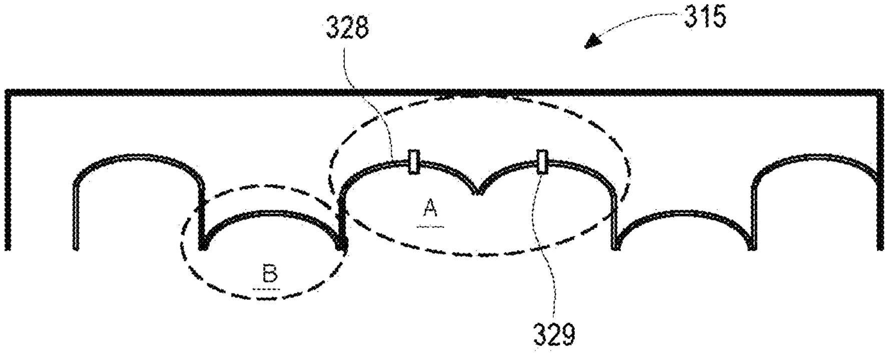
FIG. 17A is an enlarged cross-sectional view of the bracket component of FIG. 16.
Figure 17B:
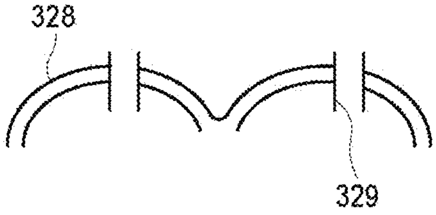
FIG. 17B is an enlarged view of area A of FIG. 16.

Referring to FIG. 14, in another embodiment, crutch 300 includes two separate posts 309*a*, 309*b* that terminate at tip components 308*a*, 308*b* and connect their top ends to the lower legs 301*c* and 301*d*, respectively. A horizontally extending support bracket 315 connects the upper portions of the two lower legs 301*c*, 301*d*. This embodiment provides extra strength for heavier persons. In other embodiments, a support spacer 316 and a though bolt 317 connect the two posts 309*a*, 309*b*, for additional stability, as shown in FIG. 15. In some embodiments, an additional horizontally extending support bracket 318 may be added to connect the lower portions of the two lower legs 301*c*, 301*d*, as shown in FIG. 16. Support brackets 315 and 316 have an inner surface 328 that includes curved areas A that are dimensioned to receive and contact the lower legs, as shown in FIG. 17A. Inner surface 328 also includes areas B that are dimensioned to receive and contact the support posts 309*a*, 309*b*. Tubular lower legs 301*c*, 301*d* and support posts 309*a*, 309*b* are held in the corresponding areas A and B, respectively, with clips 329, as shown in FIG. 17B.

Among the advantages of this invention are included one or more of the following. Crutch 100 can be assembled and disassemble easily for transport and storage purposes. Crutch 100 is inexpensive, is adjustable for people of various heights and weights and provides shock absorption for walking on any type of solid surface. The shock absorption capability of the crutch can be adjusted by selecting spheres made of different type of materials or having center through-openings with different diameters.

Several embodiments of the present invention have been described.

Nevertheless, it will be understood that various modifications may be made without departing from the spirit and scope of the invention. Accordingly, other embodiments are within the scope of the following claims.

What is claimed is:

1. An improved crutch comprising:

a first shock absorbing post comprising a first elongated tube, a second elongated tube and an intermediary tubular component positioned between the first elongated tube and the second elongated tube and wherein the intermediary tubular component comprises a central opening extending between a first end and a second end and is sized and shaped to slidably receive a first end of the first elongated tube into the first end of the central opening and a first end of the second elongated tube into the second end of the central opening;

wherein the first elongated tube comprises an opening and the intermediary tubular component comprises an elongated slot and wherein the first elongated tube is configured to be secured to the intermediary tubular component via a removable pin that is inserted into the elongated slot of the intermediary tubular component and the opening of the first elongated tube;

wherein the intermediary tubular component further comprises one or more shock absorbing components that are positioned within the central opening and wherein sliding of the first elongated tube into or out of the central opening of the intermediary tubular component compresses or decompresses the shock absorbing components, respectively; and wherein the shock absorbing components comprise compressible spheres and the compressible spheres are solid and comprise a center through-opening.

2. The improved crutch of claim 1, wherein the compressible spheres are hollow.

3. The improved crutch of claim 1, wherein the compressible spheres are glued together.

4. The improved crutch of claim 1, wherein the compressible spheres comprise one of silicone, natural rubber, neoprene rubber, fluoroelastomer or polyurethane and have a hardness in the range of 35A to 70A (Shore Durometer).

5. The improved crutch of claim 1, wherein the first elongated tube, the second elongated tube and the intermediary tubular component comprise one of aluminum, carbon fiber material, metals, alloys or composite materials.

6. The improved crutch of claim 1, wherein the intermediary tubular component further comprises a non-metallic inner lining tube or coating.

7. The improved crutch of claim 1, wherein the sliding of the first elongated tube into or out of the central opening of the intermediary tubular component comprises a range determined by the length of the elongated slot of the intermediary tubular component.

8. The improved crutch of claim 1, further comprising a second shock absorbing post comprising a first elongated tube, a second elongated tube and an intermediary tubular component positioned between the first elongated tube and the second elongated tube and wherein the intermediary tubular component comprises a central opening extending between a first end and a second end and is sized and shaped to slidably receive a first end of the first elongated tube into the first end of the central opening and a first end of the second elongated tube into the second end of the central opening;

wherein the first elongated tube comprises an opening and the intermediary tubular component comprises an elongated slot and wherein the first elongated tube is configured to be secured to the intermediary tubular component via a pin that is inserted into the elongated slot of the intermediary tubular component and the opening of the first elongated tube; and wherein the intermediary tubular component further comprises one or more shock absorbing components that are positioned within the central opening and wherein sliding of the first elongated tube into or out of the central opening of the intermediary tubular component compresses or decompresses the shock absorbing components, respectively.

9. The improved crutch of claim 8, further comprising a first connecting component extending between and connecting a second end of the first elongated tube of the first shock absorbing post and a second end of the first elongated tube of the second shock absorbing post.

10. The improved crutch of claim 8, further comprising a second connecting component extending between and connecting midway points of the first elongated tube of the first shock absorbing post and the first elongated tube of the second shock absorbing post.

11. The improved crutch of claim 8, further comprising a support component extending between and connecting the second elongated tube of the first shock absorbing post and the second elongated tube of the second shock absorbing post.

12. The improved crutch of claim 11, further comprising a post extending from a distal end of the support component and terminating at a tip component.

13. The improved crutch of claim 12, wherein the tip component comprises a bottom surface having ridges and/or indentations.

14. The improved crutch of claim 12, wherein the tip component comprises a triangular side extension used to stabilize the crutch in an upright position.

15. The improved crutch of claim 12, wherein the tip component comprises a bottom surface that is tapered.

16. The improved crutch of claim 11, further comprising a first post extending from a distal end of the second elongated tube of the first shock absorbing post and terminating at a first tip component.

17. The improved crutch of claim 16, further comprising a second post extending from a distal end of the second elongated tube of the second shock absorbing post and terminating at a second tip component.

18. The improved crutch of claim 1, further comprising a first lighting component attached to the first shock absorbing post.

19. A shock absorbing post comprising:

a first elongated tube, a second elongated tube and an intermediary tubular component positioned between the first elongated tube and the second elongated tube and wherein the intermediary tubular component comprises a central opening extending between a first end and a second end and is sized and shaped to slidably receive a first end of the first elongated tube into the first end of the central opening and a first end of the second elongated tube into the second end of the central opening;

wherein the first elongated tube comprises an opening and the intermediary tubular component comprises an elongated slot and wherein the first elongated tube is configured to be secured to the intermediary tubular component via a removable pin that is inserted into the elongated slot of the intermediary tubular component and the opening of the first elongated tube;

wherein the intermediary tubular component further comprises one or more shock absorbing components that are positioned within the central opening and wherein sliding of the first elongated tube into or out of the central opening of the intermediary tubular component compresses or decompresses the shock absorbing components, respectively; and wherein the shock absorbing components comprise compressible spheres and the compressible spheres are solid and comprise a center through-opening.

* * * * *